A. E. LEYMARIE.
SHOCK ABSORBER FOR VEHICLES.
APPLICATION FILED JAN. 23, 1913.
1,223,705.
Patented Apr. 24, 1917.
2 SHEETS—SHEET 2.
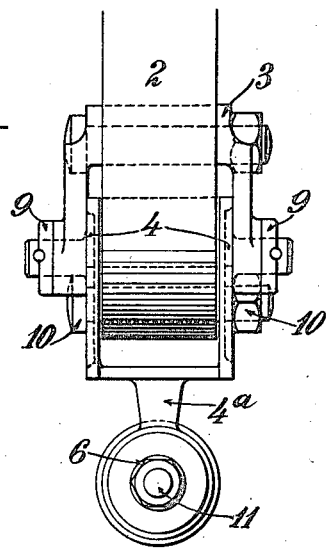
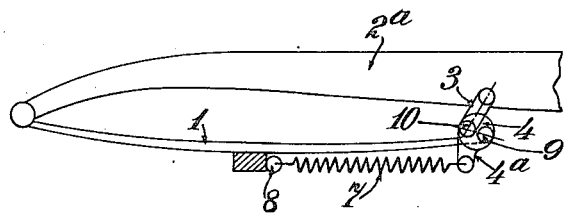
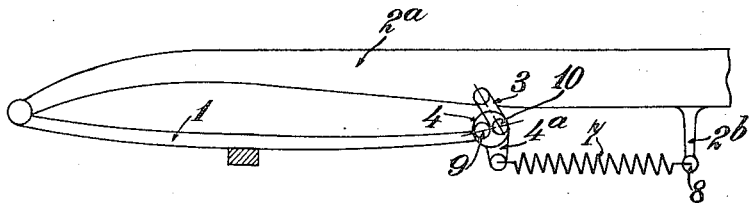
Witnesses:
C. E. Parsons
Ewd L. Johnson
Inventor:
Antoine Edmond Leymarie
By Wm Wallace White, Atty.

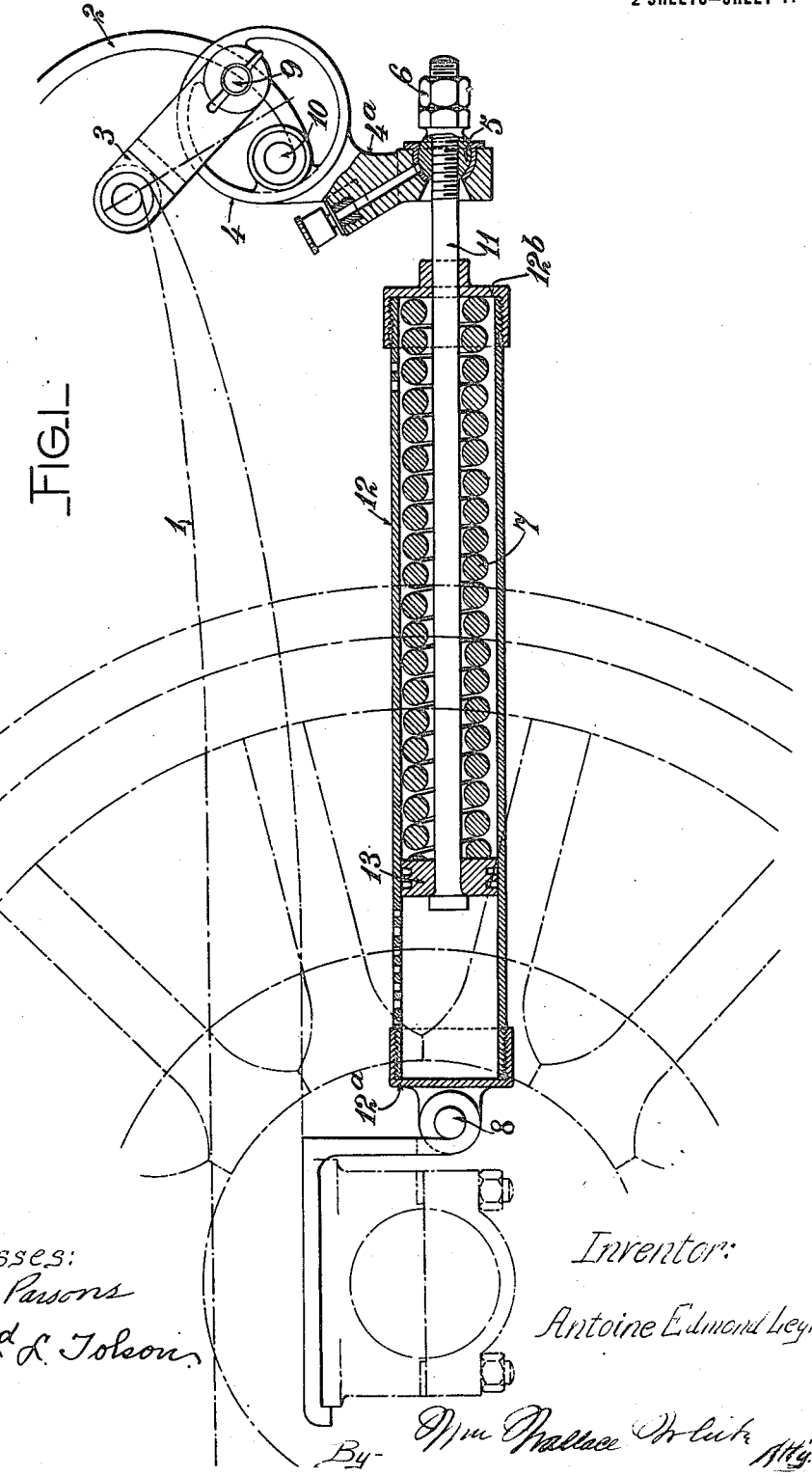

UNITED STATES PATENT OFFICE.

ANTOINE EDMOND LEYMARIE, OF PARIS, FRANCE.

SHOCK-ABSORBER FOR VEHICLES.

1,223,705.  Specification of Letters Patent.  Patented Apr. 24, 1917.

Application filed January 23, 1913. Serial No. 743,850.

*To all whom it may concern:*

Be it known that I, ANTOINE EDMOND LEYMARIE, citizen of the Republic of France, residing at 60 Boulevard de Clichy, Paris, in the Republic of France, have invented new and useful Improvements in Shock-Absorbers for Vehicles, of which the following is a specification.

This invention relates to a shock absorbing device for motor or other vehicles, which is designed to be used in addition to the ordinary spring gear of the vehicle as an auxiliary means to increase the cushioning effect obtained by means of said spring gear.

In the annexed drawings:

Figure 1 is a side elevation of the improved spring gear,

Fig. 2 is an end view thereof,

Figs. 3 and 4 show diagrammatically other embodiments of the invention.

1 is the ordinary leaf spring of any usual type carried on the axle of the wheel. The part 2 may be either a spring secured to the longitudinal bearer of the frame or a rigid spring carrier extending downwardly from said longitudinal bearer. The load is transmitted from the spring or spring carrier 2 to the main leaf spring 1 through the shorter arm 4 of a bell crank lever 4, 4ª, the shape of which may be varied according to practical requirements.

In the construction shown, the bell crank lever 4, 4ª is formed of two annular side plates 4 (Fig. 2) provided with two diametrically opposite bosses in which bolts or pivots 9, 10, are pivoted. Said side plates form the shorter arm of the bell crank lever, the effective length of said arm being equal to the distance between the pivots 9 and 10. The side plates 4 are in one piece with a downwardly extending arm 4ª which forms the longer arm of the bell crank lever 4, 4ª. The end of the spring or spring carrier 2 is pivotally secured to the bolt 10 and the bolt 9 is connected by means of two links or shackles 3 to the adjacent end of the main leaf spring 1.

The free end of the lever arm 4ª is provided with a ball socket in which a ball 5 is adapted to bear. Said ball 5 is provided with an axial hole internally threaded through which extends a threaded piston rod 11. The ball 5 may thus be used as a nut to adjust the rod 11 longitudinally with respect to the lever arm 4ª. A lock nut 6 on said rod holds the ball or nut 5 in position on the rod.

On the rod 11 is mounted a piston 13 which works in a cylindrical casing 12 horizontally arranged below the main leaf springs or the longitudinal bearers of the frame. Said casing 12 is pivotally secured at one end through a cap 12ª provided with a yoke to a horizontal bolt 8 carried on the axle box or the longitudinal bearer. At its opposite end, the casing 12 is provided with a cap 12ᵇ through which the piston 11 is adapted to slide. The arrangement of the parts is such that the movement of the piston 13 to the right in Fig. 1 is resiliently checked by any suitable means such as springs, a dash-pot working with a liquid or a gas, etc. In the example shown, the resilient means is formed of a coiled spring 7 located between the piston 13 and the cap 12ᵇ of the casing 12.

The operation is as follows: When the main spring 1 is suddenly thrown upwardly with respect to the spring or spring carrier 2 secured to the frame, under the action of a shock imparted to the wheel, said spring 1 tends to draw upwardly, by means of the links 3, the bolt 9 extending through the outer end of the shorter arm 4 of the bell crank lever 4, 4ª. The latter is thereby caused to pivot around the bolt 10 held by the spring or spring carrier 2 but in this movement, the spring 7 or other resilient means in the casing 12 is compressed through the medium of the longer arm 4ª of the bell crank lever, the piston rod 11 and piston 13, so that the pivoting movement of the bell crank lever and consequently the upward movement of the main spring 1 are gradually checked. If the respective lengths of the arms 4 and 4ª of the bell crank lever are suitably determined, a small displacement of the end of the main spring 1 will cause a much greater movement to be imparted to the ball 5 and the piston 13 will perform in the casing 12 a comparatively long stroke whereby the shock will be absorbed very slowly and very progressively by the elastic means 7. The reaction by which the main spring 1 is recalled to its original position will act in the same way, *i. e.* in a very progressive manner. As the braking action thus exerted on the main spring 1 by the spring 7 extends over a comparatively long period, no synchronism will be possible in the action of said spring 7 and that of the main spring 1 so that the suspension of the vehicle frame will be very smooth.

The improved auxiliary suspension has *inter alia* the following advantages: The strokes of the moving active part (piston 13 or equivalent) in deadening the shocks and supporting the subsequent reaction, have a great length because of the unusual length which may be given to the elastic medium. The great length of the deadening stroke permits of adjusting easily and with a sufficient accuracy the action of the shock absorber according to the load, either by turning the ball or nut 5 on the threaded rod 11 or by mounting a number of similar elastic devices, side by side, said devices being arranged so that they may be rendered inoperative separately and very quickly in the case of an important variation in the load, when running. The strains resulting from the braking action on the main spring and the reaction thereof are transmitted to the vehicle in an approximately horizontal plane so that the whole mass of the vehicle acts to absorb the same either exerted from the front to the rear or from the rear to the front. Moreover the device is left entirely unaffected by the transverse strains developed in the turns and it is easily concealed under the vehicle body and does not alter the appearance of the same.

My invention is not restricted to the construction shown in Figs. 1 and 2 and it may be modified in various ways without departing from the scope of my claims, namely in the case of front wheels, as shown by way of example in Figs. 3 and 4 where 2ª is one of the longitudinal bearers of the frame, 2ᵇ is a rigid arm secured under the same and 7 is the elastic means shown diagrammatically. In Fig. 3 the pivot or bolt 10 of the lever 4, 4 is connected to the vehicle frame through links 3 and the end of the main spring 1 is directly connected to the bolt 9 of the lever. In Fig. 4, the arrangement is substantially the same as in Fig. 3 but the free end of the elastic means 7 is connected to the frame of the vehicle through the bracket 2ᵇ instead of being attached to the axle box of the wheel.

Having now described my invention what I claim as new and desire to secure by Letters Patent is:

1. In a shock absorbing device for vehicles, the combination with a main axle-carried leaf spring and a frame-carried leaf spring having one of its ends extended downward to a point directly beneath the corresponding end of the main spring, of a bell-crank lever fulcrumed upon the end of the said frame-carried spring and disposed normally so as to provide a depending arm and an arm projecting outward from the said spring ends in a horizontal direction, a link connecting the last-named lever arm with the end of the main spring, and shock-absorbing means connecting the depending arm of the lever with the axle which carries the said main spring to resist movement of the said lever arm.

2. In a shock absorbing device for vehicles, the combination with a main axle-carried leaf spring and a frame-carried leaf spring having one of its ends extended downward to a point directly beneath the corresponding end of the main spring, of a bell-crank lever fulcrumed upon the end of the said frame-carried spring and disposed normally so as to provide a depending arm and an arm projecting outward from the said spring ends in a horizontal direction, a link connecting the last-named lever arm with the end of the main spring, and a shock-absorber comprising telescopic members, one of which is pivoted at its outer end on the axle which carries the said main spring, the other telescopic member being connected to the depending arm of the said lever, and resilient means associated with the said members to resist relative movement of the same.

In testimony whereof I have signed my name to this specification in the presence of two subscribing witnesses.

ANTOINE EDMOND LEYMARIE.

Witnesses:
 ANTOINE LAVOISE,
 HANSON C. COXE.